March 23, 1937. H. SCHUETTINGER 2,074,563
LEVEL AND PLUMB INDICATING DEVICE
Filed Aug. 20, 1935   2 Sheets-Sheet 1
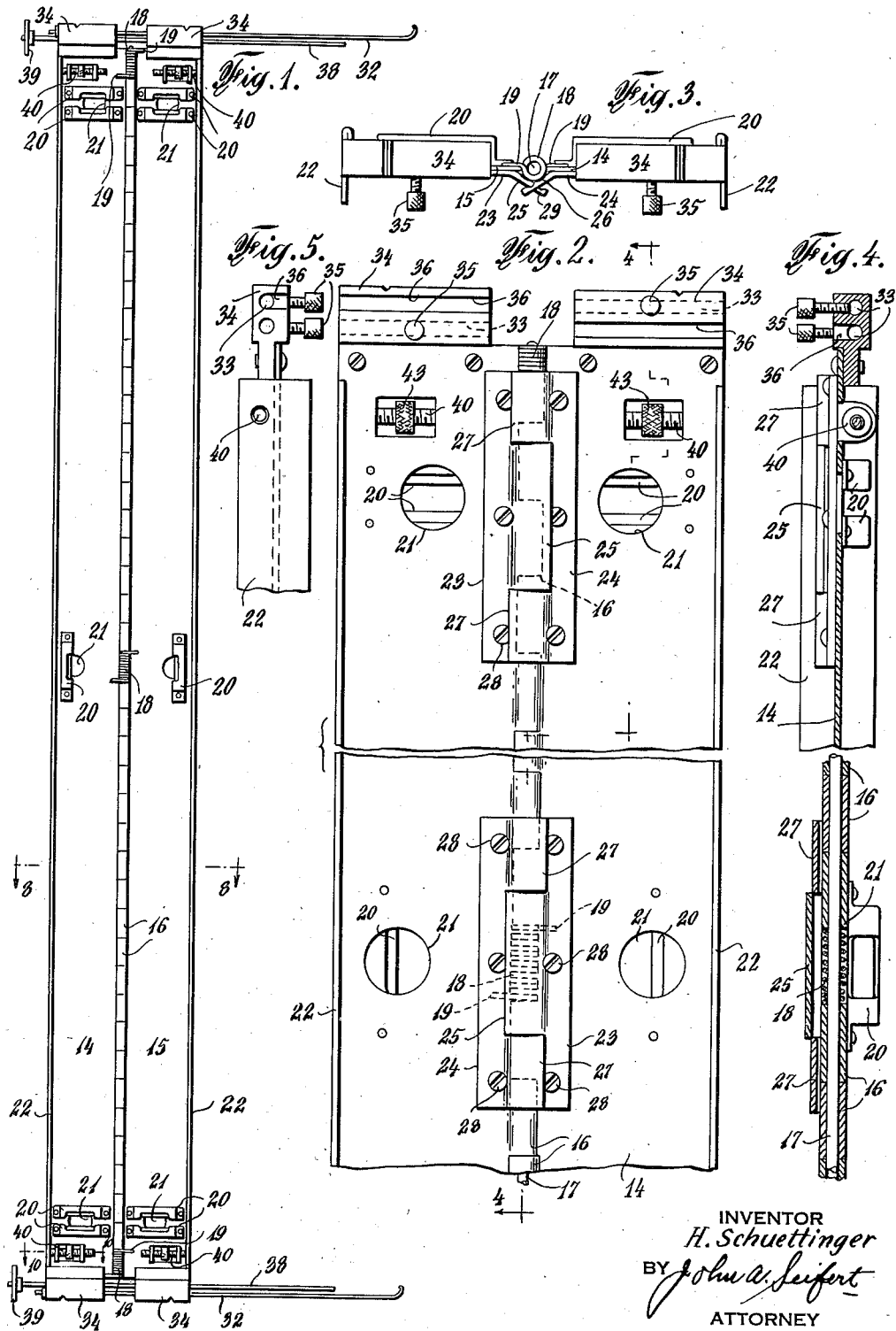
INVENTOR
H. Schuettinger
BY John A. Seifert
ATTORNEY

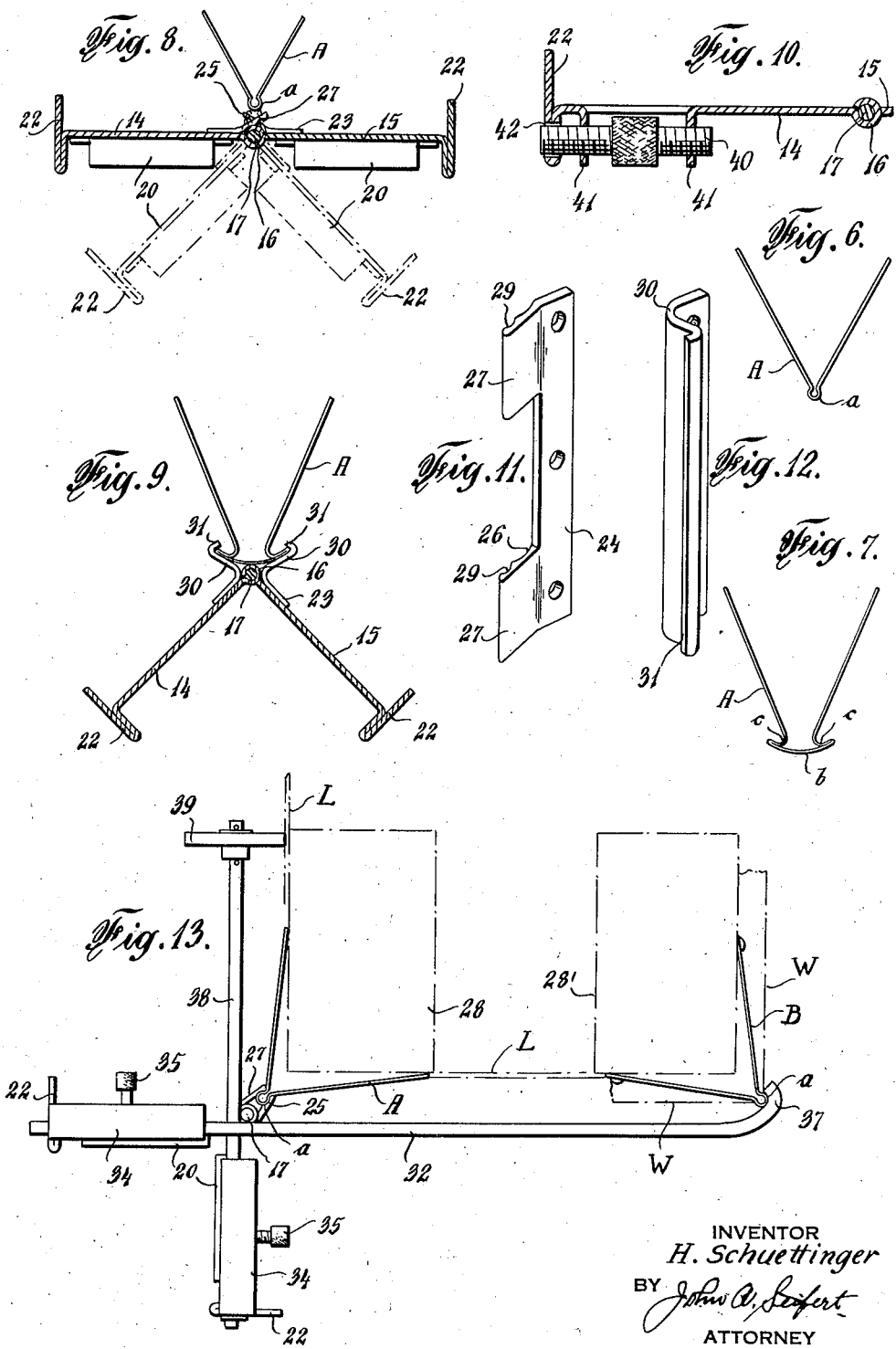

Patented Mar. 23, 1937

2,074,563

UNITED STATES PATENT OFFICE 2,074,563

LEVEL AND PLUMB INDICATING DEVICE

Herman Schuettinger, New York, N. Y.

Application August 20, 1935, Serial No. 36,966

18 Claims. (Cl. 72—128)

This invention relates to level and plumb devices, and while the device is adapted for various uses and purposes it is particularly adapted to level and plumb the bead of corner pieces of metal lath to support a coat of plaster or stucco and position said bead to extend in the plane of and constitute the corner of the intersecting surfaces of the plaster or stucco coat carried by the lath.

It is the principal object of the invention to provide a device of this character which is readily operative to grip the bead of and support a corner piece of metal lath with the bead extending in a horizontal or vertical plane, and quickly and accurately level or plumb the bead of the corner piece of the metal lath relative to a stud to which it is to be fixed and spaced therefrom a distance equal to the thickness of the plaster or stucco coat or wall carried by the lath, and to provide a device of this character which is simple in structure and highly efficient in use.

It is another object of the invention to provide means in a device to level or plumb the bead of corner pieces of metal lath to position the bead of the corner piece of metal lath to be applied to a corner of a wall supporting stud in predetermined spaced and parallel relation to the bead of a corner piece fixed to another stud to constitute the corner of the wall of an arch and level or plumb the corner bead carried by the device relative to the wall intersecting the wall of the arch and forming therewith the corner of which the bead of the corner piece of the metal lath is to constitute the corner or edge.

It is a further object of the invention to provide means in a device to level or plumb the bead of the corner piece of metal lath to predeterminedly space the bead of the corner piece from the lath to constitute the corner of intersecting plaster or other walls carried by the lath.

A still further object of the invention is the provision in a device to level or plumb the bead of corner pieces of metal lath and embodying pivotally connected straight edge members of means adapted to be mounted on a straight edge member to have adjustment to position within and to position variably outward from the straight edge to plumb or level walls having an offset portion.

Other objects and advantages will hereinafter appear.

In carrying out the invention a pair of levels, comprising plates, carrying horizontal and vertical level indicators, are pivotally connected at a longitudinal edge portion or side to have movement relative to each other and provided with means to urge the plates in one direction and normally position the levels to extend in the same plane. Jaws are arranged on the edge portion of the levels at which they are pivotally connected and adapted for the engagement of the bead of a corner piece of metal lath when the levels are positioned in angular relation to each other, said jaws having faces arranged to grip the bead and support a corner piece at and with the bead extending parallelly of longitudinal straight edges of the levels. The levels are provided at the opposite ends with straight edges adapted for the adjustable mounting of gages on either one of the levels to have adjustment relative to the longitudinal straight edge of the levels and the gages adapted to engage a bead of an attached corner piece of metal lath to position the bead of the corner piece gripped by the jaws in predetermined spaced and parallel relation to said fixed bead, or for the adjustable mounting of gages to position the bead of the corner piece gripped by the jaws in predetermined spaced relation to the lath and extend in the plane of the plaster or other wall to be carried by the wall lath. The plates also adjustably carry abutments to have adjustment to position within and to be adjusted to variable positions outward from the straight edges of the plates and adapt the device to plumb or level the bead of a corner piece of metal lath at an inclined plane relative to the horizontal or vertical and relative to an offset wall portion.

In the drawings accompanying and forming a part of this application, there is illustrated an embodiment of the invention wherein Figure 1 is an elevational view of the device looking at the rear thereof, the parts being in normal position and showing the manner of mounting the gages to position the bead of a corner piece of metal lath in predetermined spaced and parallel relation to the bead of another attached corner piece of said lath, and to position the bead of the corner piece carried by the device in predetermined spaced relation to the lath and in the plane of the plaster or other wall to be carried by the lath.

Figure 2 is a fragmentary elevational view, on an enlarged scale, of the upper and intermediate portion of the device looking at the rear of Figure 1 and showing the parts in normal position.

Figure 3 is an end elevation looking at the top of Figure 2.

Figure 4 is a sectional view taken substantially on the line 4—4 of Figure 2 looking in the direction of the arrows.

Figure 5 is a fragmentary side elevation looking at the upper left hand end of Figure 2.

Figures 6 and 7 are end elevations of corner pieces of metal lath arranged with different forms of beads the device is adapted to level or plumb.

Figure 8 is a cross sectional view, on an enlarged scale, taken on the line 8—8 of Figure 1 looking in the direction of the arrows, and showing the levels in dot and dash lines adjusted to angular position in relation to each other and in position with the jaws gripping the bead of and supporting a corner piece of metal lath as shown in Figure 6.

Figure 9 is a cross sectional view showing a modified arrangement of jaws to grip the bead and support a form of corner piece of metal lath as shown in Figure 7.

Figure 10 is a cross sectional view, on an enlarged scale, taken on the line 10—10 of Figure 1 looking in the direction of the arrows to show the arrangement and mounting of the adjustable abutments.

Figure 11 is a perspective view of one of the bead gripping jaws shown in Figures 2 and 8 and adapted to grip a form of bead of a corner piece of metal lath as shown in Figure 6.

Figure 12 is a perspective view of one of the bead gripping jaws shown in Figure 9 adapted to grip a form of bead of a corner piece of metal lath as shown in Figure 7; and Figure 13 is an end elevation showing the levels adjusted to angular position and the jaws gripping the bead of a corner piece of metal lath and positioned relative to a stud to which the lath is to be attached, and showing the manner of adjustment of the gage to plumb or level the bead gripped by the jaws in predetermined spaced and parallel relation to a bead of a corner piece fixed to an adjacent lath carrying stud, and the adjustment of another gage to predeterminedly space the stud and lath and level or plumb the bead to extend in the plane of and form the corner of the intersecting plaster or other wall carried by the lath.

In the embodiment of the invention illustrated there is provided what is in effect and herein termed a pair of levels pivotally connected at one straight edge or side, and comprising a pair of elongated metal plates of rectangular form 14, 15 provided at one longitudinal edge with hinge knuckles 16 and hingedly or pivotally connected to have angular movement relative to each other by a rod or pintle 17 extended thru said knuckles. The plates are normally yieldingly urged in one direction by springs, shown as comprising coil springs 18 and three in number, one at each end of and intermediate the ends of the pintle with an end of the springs abutting the marginal portion of the plates, as at 19, a knuckle or knuckles being removed from the plate or plates at the place where the springs are located and coiled about the pintle.

Vertical and horizontal level indicators are carried by each plate, and shown as comprising spirit levels wherein an air bubble floats in a tube of transparent material, such as glass, nearly filled with a suitable liquid, such as alcohol, the tube being carried by a housing having a portion cut away to expose a portion of the tube and permit observation of the position of the air bubble, as shown in a general way at 20. The tube carrying housing is mounted on the rear face of the plates relative to openings 21 in the plates whereby the bubble in the tube may be observed from the front of the plates. To indicate the vertical level in either position of the plates, two of said indicators are mounted on the plate adjacent each end, and to indicate the horizontal level one of said indicators is mounted intermediate of the plate to extend at a right angle to the indicators mounted adjacent the ends of the plate, as clearly shown in Figure 1. The sides or edges of the plates opposite the sides arranged with the hinge knuckles are arranged as supporting straight edges, and as shown comprises the flanging of the marginal portion of the plates laterally in one direction and then reversely folding the flanged portion upon itself, as shown at 22, whereby the plates are arranged at said edge with a flange extending for the same extent or width from the opposite faces of the plates, said reversely folded flanged portion constituting the straight edge of the plates. The springs 18 urge the plates in one direction to normal position to extend at 180 degrees from each other or in the same plane, stops, hereinafter described, being provided to limit such movement of the plates by the springs. In the normal position of the plates by the provision of the straight edges 22 and vertical and horizontal level indicators the device may be used as a level to plumb a vertical surface or level a horizontal surface.

To plumb or level the corner bead of corner pieces of metal lath, means are provided to support the corner piece with the corner bead extending parallelly of the straight edges 22 of the plates. For this purpose the plates are provided with means to be engaged upon and clamp the corner bead to support the corner piece from the device, comprising jaws 23, 24, shown as three in number, one pair of jaws adjacent each end and intermediate the ends of the plates. To support a corner piece A as of the form shown in Figure 6 having a corner bead a of circular form in cross section, one jaw of each pair of jaws, such as the jaw 23, is constructed from a rectangular plate having alined corner portions cut away, each cut away portion being of a length substantially equal to one-fourth of the length of the plate and in width one-half of the width of the plate to provide a portion intermediate the cut away portions substantially equal to one-half the length of the plate and constituting the gripping portion of the jaw, as at 25, and is offset or bent to diverge at an obtuse angle from the body of the plate. The other jaw of each pair of jaws, such as the jaw 24 (Figure 11) is also constructed of a rectangular plate having a recess 26 in one edge, said recess being of a depth substantially equal to one-half of the width of the plate and of a length slightly greater than the length of the offset portion 25 of the jaw 23, and the portions 27 at opposite ends of the recess constituting the gripping portions of said jaw and being offset or bent to diverge at an obtuse angle from the body of the plate similarly to the offset of the portion 25. One jaw of each pair of jaws is fixed to the plates 14, 15, as by means of screws engaging openings in the jaw and threaded into the plates, as at 28. Each jaw has a recess 29 in the gripping face of the portions 25, 27 of the jaws of arcuate shape in cross section to conform in shape to the bead a, said recesses extending parallelly of the straight edges 22 when the jaws are fixed to the plates. In the arrangement shown the jaws 23 of the end pair of jaws are fixed to plate 15, while said jaw 23 of the intermediate pair of jaws is fixed to the plate 14, and the jaws 24 of the pair of jaws at the ends are fixed to plate 14 and said jaw 24 of the intermediate pair of jaws is fixed to the plate 15. The jaws are also arranged to engage and limit the movement of the plates by the springs 18, as by the offset portion 25 of jaw 23 engaging jaw 24.

To level or plumb the bead of the corner piece and fix the same in position, as to a wall supporting stud 28, as shown in Figure 13, the plates 14, 15 are moved in angular relation to each other against the tension of the springs 18, the jaws being held in angular position by grasping and holding the same between the fingers and ball of the thumb, as of the left hand. The plates are moved to an extent to sufficiently spread the gripping portions 25, 27 of the jaws to engage the same over the bead $a$ and aline the bead with the arcuate portions of the jaws when the plates are relieved of the pressure of the fingers and thumb and the plates are moved under the influence of the springs 18 to cause the arcuate faces of the jaws to firmly engage the bead and support the corner piece. Holding the device and corner piece carried thereby in this manner, the corner piece is positioned relative to the stud or other part to which it is to be fixed and the corner bead plumbed by observing the position of the bubble of a vertical level indicator carried by the plates, and when in vertical position the corner piece is fixed to the stud, as by nailing, which may be readily effected by the right hand which is free for such purpose.

The gripping faces of the jaws are shaped to conform to the shape of the bead of the corner piece, one modification of the corner piece being shown in Figure 7, and commonly termed a bullnose bead, shown as comprising a portion $b$ of arcuate form in cross section with the adjacent portion reversely folded upon itself contiguous to the rear face of the bead and then again reversely bent, as at $c$, with the opposite portions of the corner piece extending in angular relation to each other. The jaws for clamping said form of corner bead and supporting the corner piece from the plates 14, 15 are in the form of a plate 30 substantially of right angle form in cross section, (Figure 12), with a longitudinal marginal portion of one of the angle portions bent laterally to hook form, as at 31. The jaws are fixed to the plates 14, 15 with one of the angle portions of the jaws extending parallelly of the plates and the angle portion with the hook extending substantially at a right angle therefrom, whereby the hook portions are adapted to engage over the folded ends of the bead $b$, as shown at Figure 9.

The corner pieces of the lath are fixed to a support therefor, such as a wall supporting stud, as shown at 28' in Figure 13, with the bead $a$ spaced from and extending parallelly of the corner and spaced from the sides of the stud and lath fixed thereto a distance equal to the thickness of the wall, such as a plaster coat, supported by the lath, as indicated in dot and dash lines W in Figure 13, with the bead $a$ extending substantially flush with the intersecting surfaces of the walls forming the corner and the bead constituting the corner edge. To fix a corner piece upon its support with the bead spaced a predetermined distance from and to extend parallelly of the bead of a corner piece fixed to an adjacent support for the supporting of the plaster coat by said corner pieces and the interposed portion of the lath L to constitute the wall of an arch, a gage is provided and means to mount the gage on the plates for quick removal and to have adjustment relative to the bead supported by the jaws. As shown, said gage member comprises a pair of rods 32 mounted to have longitudinal adjustment in a bore 33 of a member 34 fixed to the opposite ends of each plate and the outer sides arranged as a straight edge to extend at a right angle to the straight edge 22, the rods being secured in adjusted position by thumb screws 35 threaded in openings in said members and adapted to impinge against the rods. The bore 33 in the member 34 at one end of a plate, as 14, is arranged to be in alinement with a recess 36 in the side and extending parallelly of the bore in the member 34 fixed to the corresponding end of the other plate 15, as shown in Figure 2, so that the portion of the rods extending beyond the hinged connection of the plate by which it is carried will engage the recess 36 of the member 34 on the adjacent plate when the plates are adjusted to normal position and extend in the same plane. The one end of the rods is provided with a nose by bending the end portion laterally to provide a curved hook portion, as at 37. To position the bead of a corner piece supported by the device plumbed relative to a wall supporting stud, as at 28, and position said bead in predetermined spaced and parallel relation to the bead of another corner piece fixed to an adjacent stud, as the bead of the corner piece B fixed to the wall supporting stud 28', as shown in Figure 13, the hooked end 37 of the rods is engaged upon the bead of the corner piece B. The bead of the corner piece A is then plumbed relative to the stud 28 when the rods are secured in position by the screws 35 and the corner piece A is nailed to the stud 28.

The bead of the corner piece is required to be spaced from the corner and lath a distance substantially equal to the thickness of the wall supported by the lath, and to assure so positioning the bead of the corner piece, a further gage is provided adapted to be mounted on the plates 14, 15 to be quickly removed from and have adjustment relative to said plates. These gages are also in the form of rods 38 adapted to be mounted in the bores 33 of the end straight edge members 34 rotatably carrying wheels 39 at one end to engage the support or wall supporting lath secured to the support, the wheels having a diameter to space the bead $a$ the desired distance from the corner and lath and substantially equal to the thickness of the wall, as a plaster coat to be applied to and supported by the lath. It will be obvious that the means 38, 39 to space the bead of a corner piece from the corner of its support a distance equal to the thickness of the wall to be applied to the lath may be mounted in the members 34 on either of the plates 14, 15, and that the rods 32 to space the bead of the corner piece supported by the device from the bead of a corner piece fixed upon an adjacent support and thereby gage the width of the wall, as of an arch, may also be mounted in the end straight edge members 34 of either of the plates 14, 15.

In order to secure a corner piece of metal lath with the corner bead inclining to the vertical or horizontal, and to plumb or level the bead of a corner piece of metal lath relative to an offset portion or uneven portion of the support for the lath, the plates are provided with abutments adapted to be adjusted to position within the straight edge 22 and to variable positions outward from said edge, and shown as comprising threaded studs 40, Figure 10, adapted to be threaded in openings in ears 41 formed by stamping portions from the plates 14, 15 and flanging said portions laterally of the plates, the one end of the stud being adapted to have movement through an opening 42 in the folded portion of the straight edge 22. The studs have a knurled portion 43 of increased diameter intermediate the ends to facilitate rotating and adjustment of the studs. In Figure 10 the stud is shown adjusted to position with the end partly projecting from the straight edge 22. One of the adjustable abutments is arranged adjacent each end of the plates 14, 15.

It will be obvious that various modifications may be made in construction and arrangement of parts without departing from the invention, and that portions of the invention may be used without others and come within the scope of the invention.

Having thus described my invention, I claim:

1. In a plumb device for corner beads of metal lath, a pair of levels pivotally connected at one longitudinal edge adapted to be yieldably positioned to extend in the same plane and arranged with a pair of jaws at the pivotal connection adapted to grip and position the levels parallelly of the bead when the levels are adjusted to position in angular relation to each other.

2. In a plumb device for corner beads of metal lath, a pair of levels pivotally connected at one longitudinal side and yieldingly urged in one direction to a position extending in the same plane and having jaws on the pivotally connected sides adapted when the levels are positioned in angular relation to each other to grip and position the levels parallelly of the bead.

3. In a plumb device for corner beads of metal lath, a pair of levels pivotally connected at one side and arranged at said pivotal connection with means to limit the movement of the levels in one direction and position the levels to extend in the same plane and having jaws on the pivoted side, and means to yieldingly urge the levels to extend in the same plane, said jaws being adapted to be engaged upon the bead by the positioning of the levels in angular relation to each other against the yielding means and grip the bead under the influence of the yielding means and position the levels parallelly of the bead.

4. In a plumb device, a pair of levels comprising elongated plates pivotally connected at one longitudinal edge and the opposite outer edge flanged laterally to form supporting straight edges, resilient means to yieldingly urge the plates away from each other in one direction, means carried by the plates adapted to engage each other under the influence of the resilient means and position the plates to extend at 180 degrees from each other and permit use of the flanged edges of the plates as straight edges, and spirit levels mounted on the plates to extend transversely and longitudinally of the plates.

5. In a gage and plumb device for the bead of corner pieces of metal lath, a pair of levels hingedly connected at a longitudinal side and arranged with jaws at the connected sides adapted when the levels are positioned in angular relation to each other to grip and position a corner bead to extend parallelly of the levels, and a gage carried by one level arranged to engage a bead of an adjacent corner piece and position the levels and corner bead gripped by the level jaws in predetermined spaced and parallel relation to the bead of said adjacent corner piece.

6. In a gage and plumb device for the bead of corner pieces of metal lath, levels hingedly connected at a longitudinal side and arranged with jaws at the connected sides adapted when the levels are positioned in angular relation to each other to grip and position the corner bead parallelly of the levels, and a gage member carried by one level arranged to engage and predeterminedly space the corner bead from the lath.

7. In a gage and plumb device for the bead of corner pieces of metal lath, levels hingedly connected at a longitudinal side and arranged with jaws at the connected sides adapted when the levels are positioned in angular relation to each other to engage and position the corner bead parallelly of the levels, means to yieldingly urge the levels to cause the jaws to grip the corner bead, a gage member carried by each level, one gage being arranged to engage the bead of an adjacent corner piece and position the levels and corner bead gripped by the level jaws in predetermined spaced and parallel relation to the bead of said adjacent corner piece, and the other gage to engage and predeterminedly space the corner bead gripped by the level jaws from the lath.

8. In a gage and plumb device for the bead of corner pieces of metal lath, a pair of levels hingedly connected at a longitudinal side and arranged with jaws at the connected sides adapted when the levels are positioned in angular relation to each other to grip and position a corner bead to extend parallelly of the levels, and gages to predeterminedly and parallelly space the corner bead gripped by the level jaws from the bead of an adjacent corner piece, comprising a pair of rods carried by a level to have longitudinal sliding movement transversely of said level and to extend laterally therefrom, and said rods arranged with a nose at the end to engage the bead of the adjacent corner piece relative to which the bead gripped by the level jaws is to be parallelly spaced.

9. In a gage and plumb device for the bead of corner pieces of metal lath, levels hingedly connected at a longitudinal side and arranged with jaws at the connected sides adapted when the levels are positioned in angular relation to each other to grip and position the corner bead parallelly of the levels, gages to predeterminedly space the corner bead gripped by the level jaws from the lath, comprising a pair of rods carried by a level to have longitudinal sliding adjustment transversely of said level and to extend laterally therefrom, and wheels rotatably carried on the outer end of said rods to engage the lath.

10. In a plumb device, a level comprising a straight edge plate carrying horizontal and vertical level indicators, and an abutment adjustably carried by the plate and adapted to be adjusted to positions within and to project from a straight edge of the plate to permit the plumbing of a surface having an offset portion.

11. In a plumb device, a level comprising an elongated rectangular plate having a longitudinal marginal portion flanged to extend laterally from the opposite faces of the plate and forming a supporting straight edge, horizontal and vertical level indicators carried by said plate, an abutment adjustably mounted adjacent opposite ends of the plate to have adjustment to positions within and variably project from the flanged straight edge of the plate to permit plumbing of a surface having an offset portion.

12. In a plumb device for the bead of corner pieces of metal lath, a pair of levels comprising elongated straight edge plates pivotally connected at a longitudinal straight edge and carrying horizontal and vertical level indicators, pairs of jaws, one jaw of each pair of jaws being arranged on each plate to extend from the edge at which the plates are pivotally connected and the other jaw intersecting the first jaw and the pivot connection of the plates when the plates are adjusted in one direction to extend in the same plane and limit said adjustment of the plates, and the jaws being adapted to be spread for engagement of a corner bead between the jaws when the plates are adjusted in angular relation to each other, and said jaws arranged with faces to grip a corner bead between the jaws and position the corner bead parallelly of the straight edges of the plates.

13. In a level and plumb device for the bead of corner pieces of metal lath, a pair of levels comprising elongated plates having one marginal portion flanged to extend laterally from the opposite faces of the plates forming a supporting straight edge for each plate and pivotally connected at the opposite longitudinal edge portion, horizontal and vertical level indicators mounted on each plate, jaws on the edge portion of the plates at which they are pivotally connected, each jaw engaging the opposite jaw to limit the movement of the plates in one direction relative to each other with the plates extending in the same plane and adapted for engagement of the corner bead between the jaws when the plates are positioned in angular relation to each other, and said jaws having faces arranged to grip and position a corner bead parallelly of the straight edges of the plates.

14. In a level and plumb device as claimed in claim 13, straight edge members fixed to the opposite ends of the plates, and gages carried by said members to have adjustment relative to the straight edges of the plates and jaws to position a corner bead gripped by the jaws in predetermined spaced and parallel relation to another corner bead and in predetermined spaced relation to the corner and lath.

15. In a level and plumb device for the bead of corner pieces of metal lath, a pair of levels comprising elongated rectangular plates pivotally connected at a longitudinal marginal portion and the outer marginal portions arranged as parallelly extending straight edges, means to yieldingly urge the plates in one direction, horizontal and vertical level indicators mounted on one face of each plate and the plates having openings relative to said indicators to observe the same from the opposite faces of the plates, jaws on the pivotally connected marginal portions of the plates, each jaw on plate engaging the corresponding jaw on the other plate to limit the movement of the plates by the yielding means and position the plates to extend in the same plane, said jaws being adapted for the engagement of a corner bead between the same when the plates are adjusted in angular relation to each other and to grip said corner bead under the influence of the yielding means, and said jaws having faces to position the corner bead gripped thereby parallelly of the straight edge of the plates.

16. In a level and plumb device as claimed in claim 15, straight edge members at the opposite ends of each plate, each of said members having a longitudinal bore and a recess in a side thereof extending parallelly of the bore, and the bore in a member of one plate arranged in alinement with the recess in the member on the corresponding end of the other plate, gages slidably mounted in the bores of said members of one plate and having a portion to engage the bead of a corner piece on a corner adjacent the corner to which the corner bead gripped by the jaws is to be applied to predeterminedly space the same from the mounted corner bead, and gages slidably mounted in the bores of said members of the other plate arranged to predeterminedly space the corner bead gripped by the jaws from the corner to which the corner bead gripped by the jaws is to be applied and a wall intersecting and forming said corner.

17. In a plumb device, a pair of elongated members arranged with a series of equidistantly spaced knuckles at a longitudinal edge of each member, each knuckle being of a length substantially equal to the space between the adjacent knuckles and the knuckles of one member being in opposed relation to the spaces between the knuckles of the other member, a pintle engaged in the knuckles of each member to pivotally connect the members at said longitudinal edge, and spirit levels mounted on the members to extend transversely and longitudinally of the members.

18. In a plumb device, a pair of elongated members arranged with a series of equidistantly spaced knuckles at a longitudinal edge of each member, each knuckle being of a length substantially equal to the space between the adjacent knuckles with the knuckles of one member being in opposed relation to the spaces between the knuckles of the other member and a member having knuckles removed therefrom, a pintle engaged in the knuckles of each member to pivotally connect the members at said longitudinal edge, springs coiled about the pintle where the knuckles are removed from the member and having the ends thereof engaging the members to yieldingly urge the members in a direction away from each other, and spirit levels mounted on the members to extend transversely and longitudinally of the members.

HERMAN SCHUETTINGER.